July 24, 1951 W. I. SULLINS 2,562,136
BATTERY POST AND CABLE TERMINAL CLEANER TOOL
Filed Dec. 17, 1947
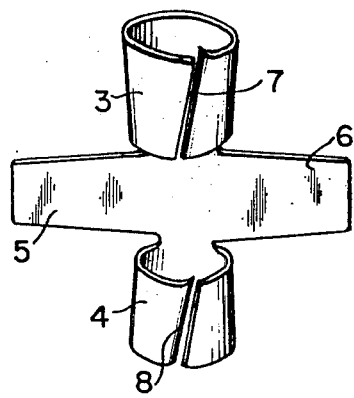
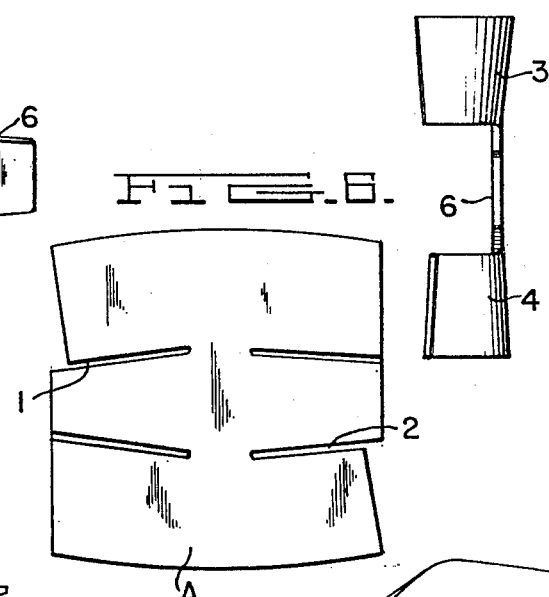
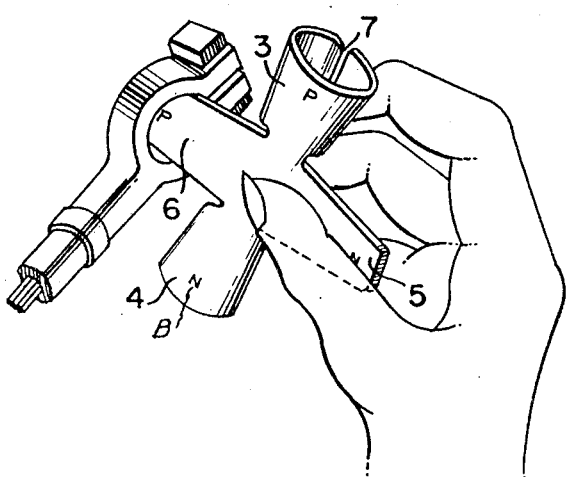
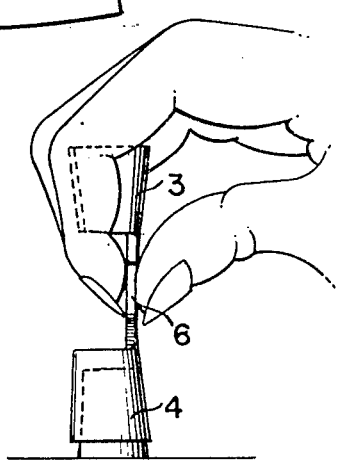
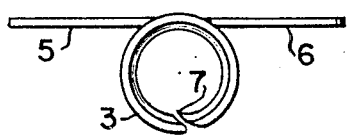
Inventor
William I. Sullins
By Lloyd W. Patch
Attorney Patented July 24, 1951

2,562,136

UNITED STATES PATENT OFFICE 2,562,136

BATTERY POST AND CABLE TERMINAL CLEANER TOOL

William Isaac Sullins, Hamilton, Ala.

Application December 17, 1947, Serial No. 792,290

1 Claim. (Cl. 15—105)

My invention relates to improvements in battery post and cable terminal cleaner tools, and particularly to an article of this character intended and adapted for cleaning the negative and positive posts and the corresponding cable terminals, in connection with storage batteries, and for use in other like connections.

An object of this invention is to provide a tool which can be used to clean the outside or contact surfaces of both posts and the inside contact surfaces of both battery terminals, of a battery as installed in place and in use in an automobile or the like, or when installing or replacing or changing batteries.

Another object is to provide a cleaner tool of this character which is of simple and inexpensive construction, with the parts thereof readily formed from cheap sheet material, by ordinary methods or processes and by the use of ordinary equipment, without requiring special operations or specialized machines and equipment.

Still another object is to provide a battery post and cable terminal cleaner tool which is made up and is cut or stamped and is formed and shaped from a single piece of sheet metal, and which presents all parts and features in such relation that as each operating part is brought into position for use the other parts are presented as key-like handle portions accessible for readily and conveniently grasping and holding and manipulating the tool.

Yet another purpose resides in the provision of a tool of this character having parts for operating upon each of the surfaces intended and desired to be cleaned, and with the other parts disposed in symmetrically balanced relation so that the tool can be held in one hand, and the operator can readily reach into remote locations to thus work upon the posts of a storage battery installed in place and to clean cable terminals as installed, without the necessity of removing and completely disconnecting the cables from the installation.

With the above and other objects in view, some of which will be apparent to those skilled in the art, and others of which result from the construction and arrangement of the parts and the use of the device, my invention includes certain novel features and combinations and arrangemens of parts, which will be hereinafter set forth in connection with the drawings and then will be pointed out in the claim.

In the drawings:

Figure 1 is a perspective view showing a battery post and cable terminal cleaner tool constructed in accordance with my invention.

Figure 2 is a perspective view showing the tool and disclosing the manner in which this will be grasped and will be placed and manipulated when cleaning a cable terminal.

Figure 3 is a view in edge elevation of the tool.

Figure 4 is a view in edge elevation taken at substantially right angles to the showing in Fig. 3.

Figure 5 is a view similar to Fig. 4, illustrating the manner in which the tool is held and manipulated in cleaning a battery post.

Figure 6 is a flattened out showing of a pattern or sheet from which the tool can be made.

My improved cleaner tool is adapted for use in connection with battery posts and battery cable terminals such as now and usually employed in connection with storage batteries, as installed in automobiles and in other like connections; and, the tool can be made in appropriate sizes and shapes for other uses.

As here illustrated, the cleaner tool is made up and is shaped and formed from a single piece of sheet metal, the blank or flattened form of which is generally indicated at "A," in Fig. 6. This piece of sheet material is formed in its outline, and has certain edges cut or split, as at 1 and 2, so that the cleaner tool can be bent up and formed therefrom to provide the two oppositely extending open sleeve-like post scraper portions 3 and 4, and the two oppositely extending inside scraper portions 5 and 6, interposed between and extending substantially at right angles with respect to the axes of the sleeve-like post scraper portions 3 and 4.

With storage batteries as now manufactured, it is customary to make the positive battery posts of slightly larger diameter than the negative battery posts, and both battery posts are tapered. Accordingly, the sleeve-like scraper parts or portions 3 and 4 are made tapered, and the two portions are provided with designating markings, as at B in Fig. 2, so that the user can immediately identify the proper post scraper portion to be applied and used upon the positive and the negative posts of a storage battery.

As stated, the sleeve-like portions 3 and 4 are split, and in each instance the edges 7 and 8 are sharpened and are turned in to be presented as scraper blades, after the manner perhaps best shown in Fig. 3.

As shown in Fig. 6, the lines of cutting or splitting of the sheet metal, at 1 and 2, are angularly disposed from parallel lines so that the terminal scraper portions 5 and 6 are accordingly tapered with their outer ends relatively smaller than the inner ends, and the scraper portion 5 for the negative battery cable terminal is made of slightly less transverse dimension than the positive terminal scraper 6. As indicated in Fig. 6, the shaping and cutting of the blank for making up my improved cleaner tool is such that the tool can be readily and conveniently and inexpensively made from a single piece of sheet metal, such as iron or non-ferrous metals, or any material that will be suitable for the particular conditions of use. As the tool is made up, the oppositely extending post scraping sleeve-like portions 3 and 4 extend in opposite directions, and the inside terminal scraper portions 5 and 6 extend in opposite directions and are disposed between and substantially at right angles with respect to the portions 3 and 4. Thus, when either of the post scraper portions is placed in position for use, the terminal scrapers 5 and 6 extend substantially transversely after the manner of a key-like hand grip portion so that the tool is readily grasped and held and is easily and accurately manipulated, after the manner illustrated in Fig. 5, when in use.

In using the tool and employing either the inside scraper 5 or the scraper 6, the sleeve-like post scraper portions 3 and 4 extend transversely after the manner of a key or hand grip portion and the tool can then be readily grasped and held and manipulated for accurate scraping or operation upon the inside surface of a battery cable terminal as and after the manner illustrated in Fig. 2.

Thus it will be seen that I have provided a battery post and cable terminal cleaner tool which is readily and inexpensively made up of a sheet material member with all of the scraper parts or portions disposed to be substantially radially outwardly presented with each scraper portion thus freely accessible and convenient for complete use, and with the other scraper portions disposed and serving as hand grip portions with a key-like handle so that the tool can be readily turned or revolved and can be manipulated to accomplish quick and accurate scraping and resurfacing of the positive and negative portions of a storage battery, and the connecting terminals of positive and negative cables for such batteries.

While I have herein shown and described only certain specific embodiments and constructions of my invention, it will be appreciated that changes and variations can be made in the form, construction, and manner of making and shaping the tool, without departing from the spirit and scope of my invention.

I claim:

A battery post and cable terminal cleaner tool consisting of a single sheet metal member having opposite sides thereof severed inwardly on oblique opposed lines to provide oppositely extending tapered terminal scraper portions and having the edges as severed beyond the sides of said tapered scraper portions rolled around to present substantially split and tapered sleeve-like post scraper portions with one edge of each thus rolled portion disposed in post surface scraping relation.

WILLIAM ISAAC SULLINS.

REFERENCES CITED

The following references are of record in the file of this patent:

UNITED STATES PATENTS

| Number | Name | Date |
| --- | --- | --- |
| 651,385 | Randall | June 12, 1900 |
| 1,671,843 | Scott | May 29, 1928 |
| 1,741,531 | Miller | Dec. 31, 1929 |
| 1,746,086 | Maier | Feb. 4, 1930 |

FOREIGN PATENTS

| Number | Country | Date |
| --- | --- | --- |
| 141,975 | Great Britain | Apr. 29, 1920 |